United States Patent [19]

Yoshiba

[11] Patent Number: 5,267,310
[45] Date of Patent: Nov. 30, 1993

[54] CONTROL CIRCUIT FOR AUTOMATIC ELIMINATION OF TELEPHONE LINE NOISE

[75] Inventor: Junichirou Yoshiba, Ohtsu, Japan

[73] Assignee: Murata Kikai Kabushiki Kaisha, Kyoto, Japan

[21] Appl. No.: 674,534

[22] Filed: Mar. 22, 1991

[30] Foreign Application Priority Data

Mar. 24, 1990 [JP] Japan ................. 2-29838[U]

[51] Int. Cl.$^5$ ........................................ H04M 11/00
[52] U.S. Cl. ..................................... 379/416; 381/94; 381/71; 328/167
[58] Field of Search ............... 379/414, 416, 417, 6; 381/94, 71; 328/167

[56] References Cited

U.S. PATENT DOCUMENTS 1,114,409  10/1914  Speed ........................... 379/416
4,649,505   3/1987  Zinser, Jr. et al. .......... 381/94 X
5,073,924  12/1991  Frisby ........................ 379/414 X
5,131,047   7/1992  Hashimoto et al. ......... 381/73.1 X Primary Examiner—James L. Dwyer
Assistant Examiner—Paul A. Fournier
Attorney, Agent, or Firm—Spensley Horn Jubas & Lubitz

[57] ABSTRACT

A control circuit for automatic elimination of telephone line noise, a reference tone selecting device for selecting the tone signal on the telephone line; a mode switching device for switching registration of noise pattern and operation of speech transmission; a noise pattern outputting device for outputting and storing frequency spectrum pattern in accordance with noise element coming on the telephone line during the noise pattern registration pattern; and a noise eliminating circuit for eliminating noise element from the transmission signal on the telephone line in accordance with the frequency spectrum pattern.

6 Claims, 5 Drawing Sheets

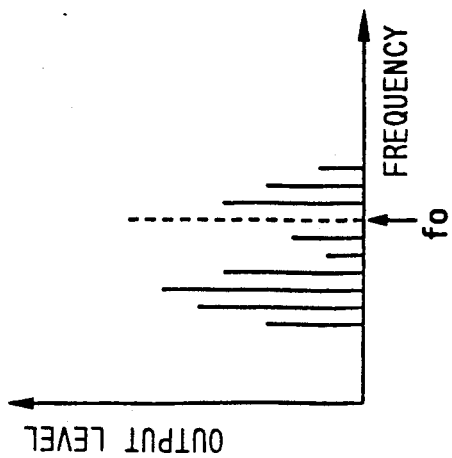
FIG. 3a
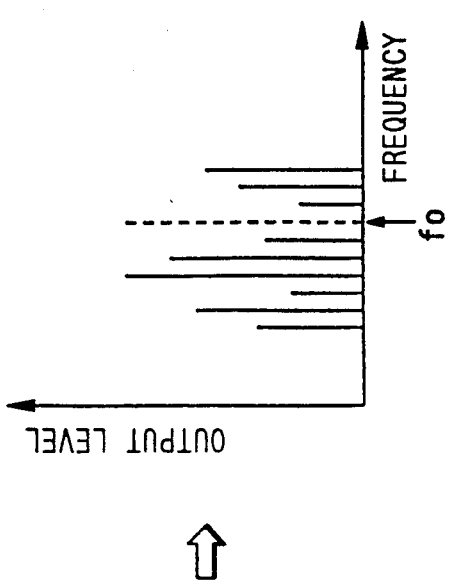
FIG. 3b
FIG. 3c
FIG. 5

CONTROL CIRCUIT FOR AUTOMATIC ELIMINATION OF TELEPHONE LINE NOISE

FIELD OF THE INVENTION

The device of the present invention relates to a control circuit for automatically eliminating telephone line noise and more specifically to a control circuit which may be included in a telephone set or a facsimile apparatus to automatically eliminate noise appearing when the telephone line is used.

RELATED ART STATEMENT

With astonishing the development of telephone systems, the telephone networks now reach every corner of the world. Moreover, high performance telephone exchanges and telephone sets have also been developed and used. In the case of connecting between each household or office and an exchange of telephone office with a telephone line utilizing underground cable or aerial cable, when the telephone line is laid in the vicinity of noise sources such as a power substation or a high output signal transmitting station, a high amplitude noise element is induced on the telephone line. Moreover, the telephone exchanges installed within the telephone office have gradually been replaced with the latest electronic exchanges which have suppressed generation of noise as much as possible. However, some exchanges which were produced before World War II are still in use in the old cities and such exchanges generate a large amount of noise due to the switching connection at the relay contacts.

When large amounts of noise is superposed on a telephone signal the signal to noise ratio (S/N ratio) is lowered. Accordingly, smooth conversation is interfered with, the transmitting or receiving of an image through facsimile apparatus is adversely affected and the transmitting and receiving times become longer, remarkably degrading the transmission quality of information to be transmitted through the telephone line.

OBJECT AND SUMMARY OF THE INVENTION

The device of the present invention has been proposed considering such background and therefore, it is an object of the present invention to provide an automatic telephone line noise elimination control circuit which may be included in a telephone set or a facsimile apparatus for transmitting signal through the telephone line to realize smooth conversation and transmission of speech and video signals by eliminating, on the real time basis, the noise element generated on the telephone line.

In view of attaining the object explained above, a preferred embodiment of the present invention may include reference tone selecting means for selecting the tone signal on the telephone line; mode switching means for setting the registration of noise pattern and operation of speech transmission; noise pattern outputting means for outputting and storing frequency spectrum pattern in accordance with a noise element coming in on the telephone line during the noise pattern registration pattern; and a noise eliminating circuit for eliminating noise element from the transmission signal on the telephone line in accordance with the frequency spectrum pattern stored in the noise pattern extracting means.

In accordance with a preferred embodiment of the present invention, the noise pattern outputting means may include a structure like the first embodiment for outputting and storing only a frequency spectrum pattern of superposed noise pattern as the noise pattern by matching both phase and level of the dial tone signal transmitted to the telephone line before the line is connected with the reference dial tone signal generated in the reference tone setting means and then outputting a difference between these or a structure like the second embodiment for outputting and storing a frequency spectrum pattern forming noise element as the noise pattern by eliminating the frequency spectrum element forming the dial tone signal from the dial tone signal transmitted to the telephone line before the line is connected.

BRIEF DESCRIPTION OF THE DRAWINGS

FIG. 3a, FIG. 3b and FIG. 3c are diagrams for explaining change of frequency spectrum pattern of noise element;

FIG. 5 shows waveforms indicating noise eliminating operation of the present device.

DETAILED DESCRIPTION OF PREFERRED EMBODIMENT

In the automatic noise elimination control circuit of this invention, the frequency spectrum pattern of the noise element superposed on the transmitting signal on the telephone line is stored when the telephone set or facsimile apparatus is installed. Thereby, the noise element depending on the stored frequency spectrum pattern is eliminated automatically when the telephone line is connected.

A preferred embodiment of the present invention will be explained with reference to the accompanying drawings.

Figure 1:
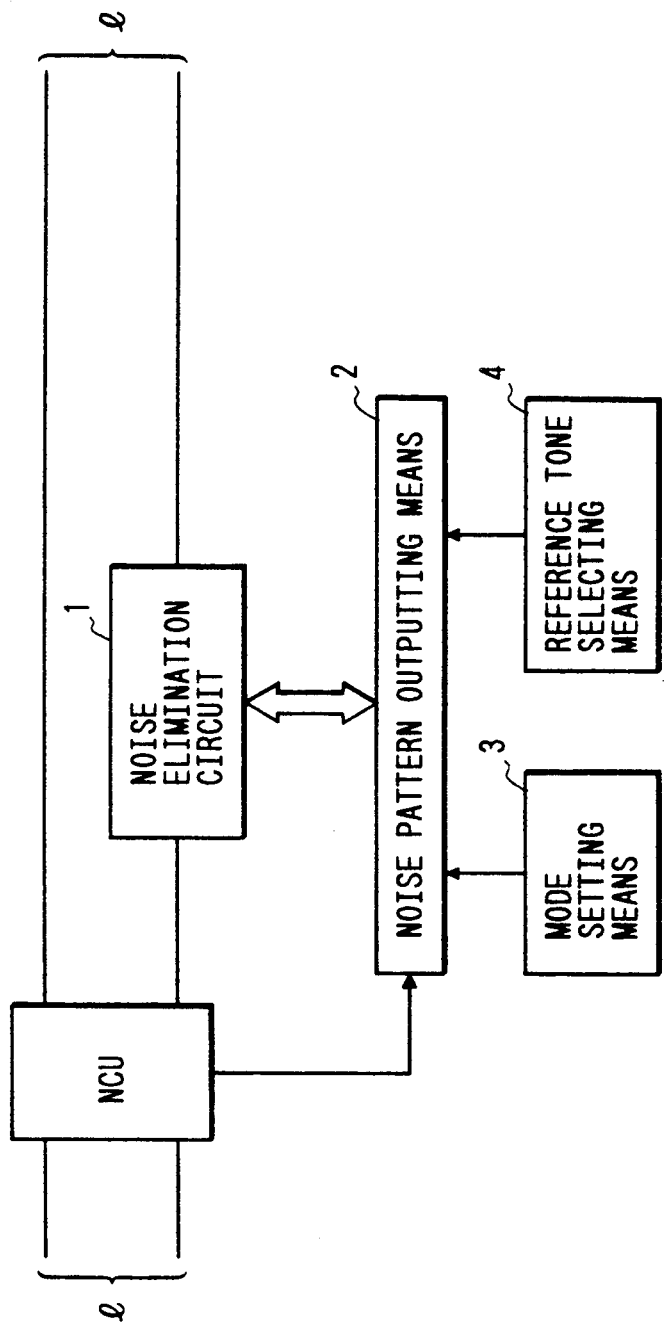
FIG. 1 is a functional block diagram indicating the basic structure of the device of the present invention.

FIG. 1 is a functional block diagram indicating a basic structure of the invention.

As shown in the figure, the control circuit for automatic elimination of telephone line noise may include a noise elimination circuit 1 for eliminating noise element from the transmitting signal transmitted over the telephone line; a noise pattern outputting means 2 for outputting and storing frequency spectrum pattern depending on a noise element from the transmitting signal to be transmitted over the telephone line; a mode setting means 3 for switching registration of noise pattern and operation mode of speech signal transmission; and a reference tone selecting means 4 for selecting a class of dial tone signal transmitted over the telephone line 1. NCU is a communication control unit to be explained later but it is not the essential structure of the present invention.

Figure 2:
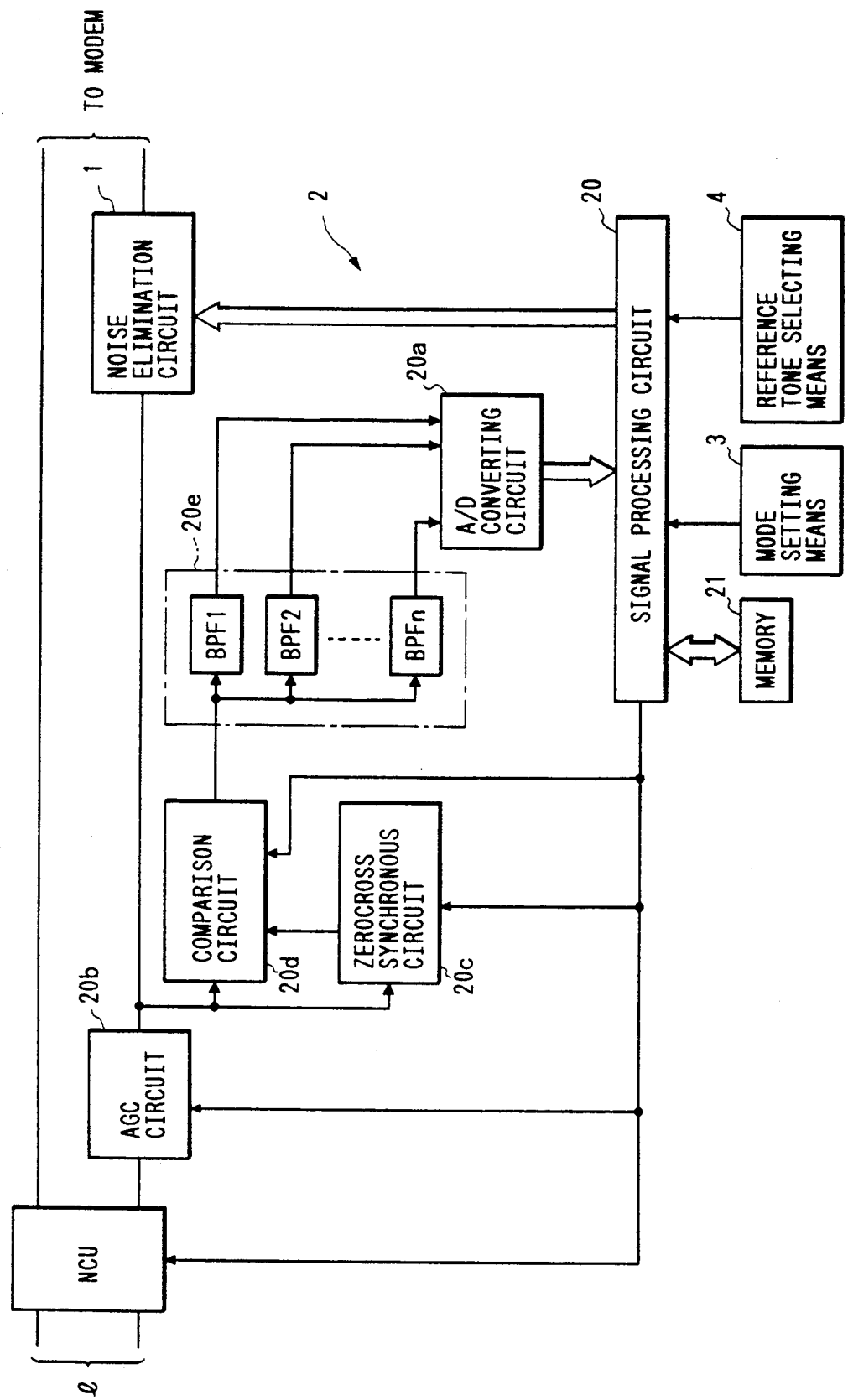
FIG. 2 is a block diagram of an internal circuit indicating a first embodiment.

FIG. 2 is a block diagram of a control circuit for automatic elimination of telephone line noise as the first embodiment of the present invention.

In this figure, the numeral 1 denotes a noise elimination circuit which is inserted in series in the side of one line of the telephone line 1 to eliminate noise element transmitted together with the speech signal to the telephone line 1; 20a, an A/D conversion circuit for converting analog data to digital data; 3, a mode setting means for switching the noise pattern registration mode and ordinary speech signal transmission mode; 4, a reference tone selecting means for selecting and setting the reference dial tone signal in accordance with the dial tone signal transmitted to the telephone line 1; 21, a memory for storing the noise pattern output from the A/D converting circuit 20a as the digital data, comprising, in the case of the this first embodiment, an auto-gain control circuit 20b for matching levels and phases of the reference dial tone signal selected by the reference tone selecting means 4 and the reference dial tone signal actually transmitted to the telephone line 1; a zerocross synchronous circuit 20c, a comparison circuit 20d for outputting only the noise element from the dial tone signal and separating and outputting the frequency element included in the noise element; and a band pass filter 20e.

The signal processing and control in these sections are centralizingly conducted by a signal processing circuit 20 formed by a CPU and a noise pattern outputting means 2 is structured through combination of the signal processing circuit 20, A/D converting circuit 20a, auto-gain control circuit 20b, zerocross synchronous circuit 20c, comparison circuit 20d, frequency separation circuit 20e and memory 21.

Here, like the second embodiment explained later, the noise elimination circuit 1 has a structure to eliminate noise element from the transmitting signal to be transmitted over the telephone line 1 that a plurality of voltage control type band pass filters specifying the selection frequency by giving the center frequency of each frequency step of Δf within the frequency band included in the noise element and attenuation level of these voltage control type band pass filters is controlled by a filter control circuit.

The control operation in such first embodiment is conducted as follows.

(1) When the noise pattern registration mode is selected by the mode setting means 3, the reference dial tone signal depending on the dial tone signal transmitted when the telephone line is connected is selected by the reference tone selecting means 4 and the registration start switch (not illustrated) is operated, a line control signal is transmitted to NCU from the signal processing circuit 20 and the telephone line 1 is connected.

(2) When the telephone line 1 is connected, the autogain control circuit 20b adjusts the dial tone signal input through NCU to the same level as the reference dial tone signal selected by the reference tone selecting means 4 and the zerocross synchronous circuit 20c matches the phases of these signals.

As a result, an output of the comparison circuit 20d becomes zero when the noise element is not superposed on the dial tone signal and only the noise element is output when the noise element is superposed on the dial tone signal.

(3) Thereby, the noise element input to the frequency separation circuit 20e is separated into a plurality of frequency elements by the band pass filters BPF1 ~ BPFn and these frequency elements are converted to digital data by the A/D converting circuit 20a and then stored in the memory 21.

FIG. 3a, FIG. 3b and FIG. 3c show the spectrum pattern of each frequency forming noise element in every passage of Δt hours from starting the superposition of noise. In the case of this invention, such frequency spectrum pattern is stored in the memory 21 as the digital data.

Outputting of noise element is carried out in the preceding stage of connection of the telephone line by the method described above and completed when the signal processing circuit 20 detects the frequency spectrum of the same pattern. In this timing, the time interval of noise element is also detected simultaneously and is stored within the memory 21 as the noise period.

Figure 4:
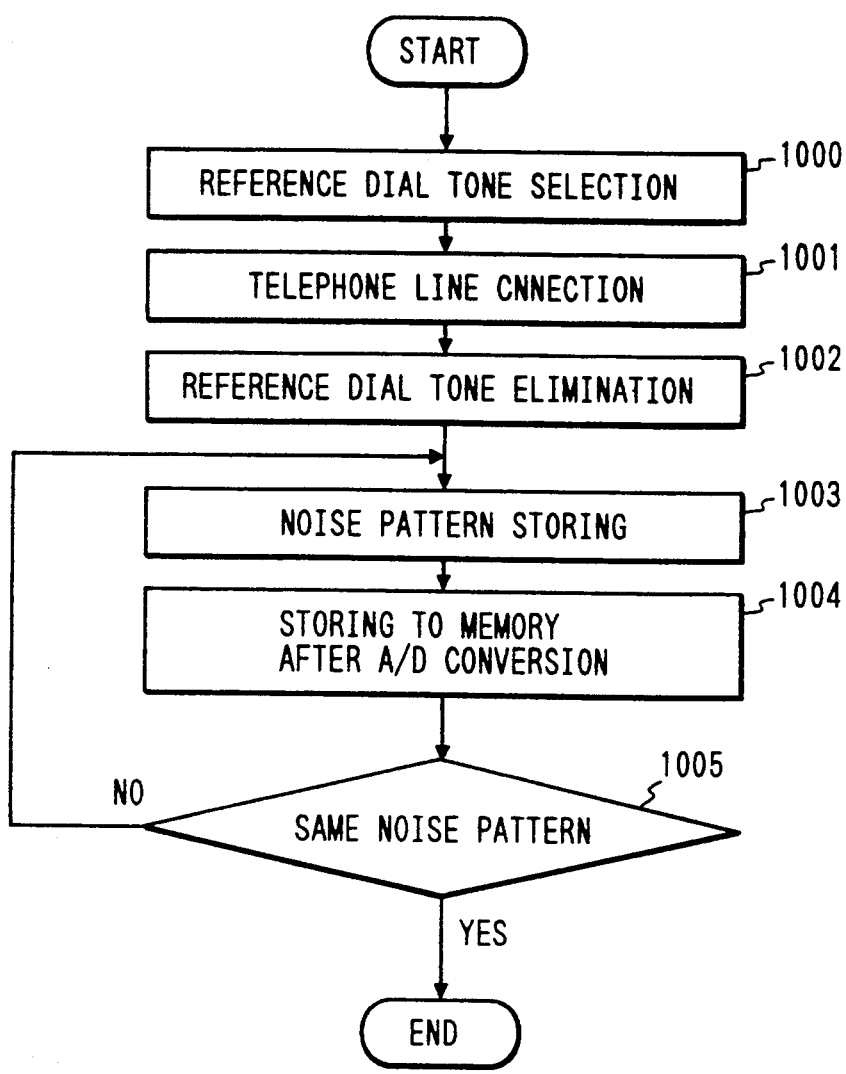
FIG. 4 is a flowchart for explaining operations in the noise pattern registration mode.

The operations in the noise pattern registration mode explained above will be illustrated in FIG. 4 as the flowchart (steps 1000~1005).

In such first embodiment, the noise pattern outputting means 2 cancels the dial tone signal by synchronizing it with the reference dial tone signal in the same level and therefore accurately outputs the frequency spectrum pattern of the noise element superposed on the dial tone signal.

Next, noise eliminating operation in the ordinary conversation and transmission mode will be explained.

(1) When the mode setting means 3 selects the conversation and transmission mode, starts the conversation or starts transmission of video signal by operating the start switch (not illustrated), the transmitting signal is transmitted to the noise elimination circuit 1 through the auto-gain control circuit 20b.

(2) The noise elimination circuit 1 operates a filter control circuit with a control signal transmitted from the signal processing circuit 20 in accordance with the noise appearing period and adjusts attenuation level of the voltage control type band pass filter in accordance with the frequency element stored in the memory 21 as the noise pattern in order to eliminate only the noise element from the transmitting signal.

FIG. 5 shows noise element eliminating operation by the control circuit for automatic noise elimination according to the invention. The noise element N superposed on the dial tone signal T is automatically eliminated by the speech signal or video signal as a result that the noise elimination circuit 1 is operated synchronously with appearance of noise when the telephone line 1 is connected.

As explained above, in the first embodiment, the spectrum pattern of noise element periodically superposed on the tone signal in the preceding stage of connecting the telephone line 1 is sampled and stored in the memory. Thereby, the S/N ratio can be improved by eliminating, on the real time basis, the noise element superposed during conversation or transmission and reception. Accordingly, articulation in transmission of speech and video signals can be enhanced and transmission rate can also be improved.

Figure 6:
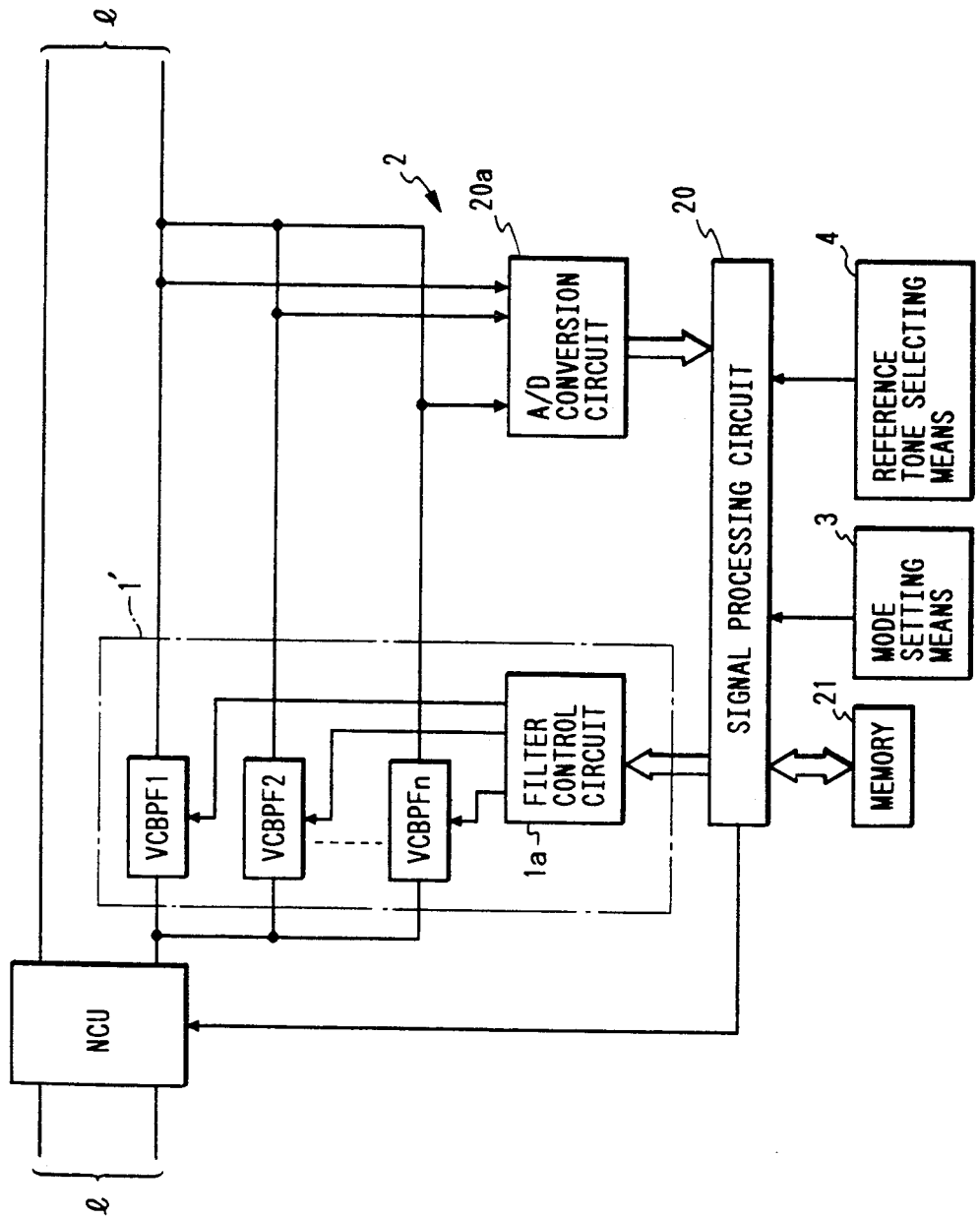
FIG. 6 is a block diagram of an internal circuit indicating the second embodiment.

FIG. 6 is a block diagram of an example of the basic structure of a second embodiment. In this figure, the numeral 1' denotes a noise elimination circuit to be inserted in series in the side of one line of the telephone line 1 in order to sample and eliminate the noise generated on the telephone line; 3, a mode setting means for switching and setting the operations of noise pattern registration mode and conversation/ transmission mode; 4, a reference tone selecting means for selecting the dial tone signal transmitted to the telephone line 1; 20a, an A/D converting circuit for converting the frequency element separated by the noise elimination circuit 1' into the digital data; 21, a memory for storing digital data output from the A/D converting circuit 20a; NCU is a conversation line control circuit for controlling connection of the telephone line 1. The signal processings and control processings of respective sections are centralizingly conducted in the signal processing circuit 20.

In this embodiment, the function of the noise pattern outputting means 2 can also be realized by the structure comprising noise elimination circuit 1' in addition to the signal processing circuit 20, A/D converting circuit 20a and memory 21.

The reference tone selecting means 4 selects the class of dial tone signal transmitted to the telephone line 1 until the speech signal and video signal are transmitted. In case it is connected to the external line, it can select the dial tone signal of 400 Hz. In case it is connected to the private branch exchange PBX, it can select the dial tone signal of the frequency depending on PBX (composite tone is used).

The noise elimination circuit 1' in this embodiment also has the noise element sampling function. Therefore this circuit has a structure in order to separate and output the frequency element of the signal transmitted to the telephone line 1 that the voltage control type band pass filters (hereinafter described as VCBPFs) VCBPF1~VCBPFn specifying the center frequency for each frequency step of Δf in the necessary frequency band are connected in parallel and each attenuation level of these voltage control type band pass filters can be controlled by the filter control circuit 1a.

Next, operation of the control circuit for automatic elimination of telephone line noise of the second embodiment will be explained.

(1) When the mode setting means 3 selects the noise pattern registration mode, selects the reference dial tone signal depending on the dial tone signal of telephone line in the reference tone selecting means 4 and operates the registration start switch (not illustrated), the signal processing circuit 20 transmits a line control signal to NCU and connects the telephone line 1.

(2) When the telephone line 1 is connected, the control signal is transmitted to the filter control circuit 1a of the noise elimination circuit 1' from the signal processing circuit 20. Thereby attenuation of voltage control type band pass filter VCBPFo which has set the frequency of of reference dial tone selected by the reference tone selecting means 4 to the filter frequency becomes maximum and attenuation of the other voltage control type band pass filter VCBPF is set to zero.

As a result, the noise elimination circuit 1' cuts off the frequency element of dial tone signal transmitted to the telephone line 1 and therefore the noise elimination circuit 1' separates and outputs the frequency forming the noise element only when noise element is superposed on the telephone line 1.

(3) Therefore, the signal processing circuit 20 watches appearance of noise superposed on the telephone line 1 with the digital data input through the A/D converting circuit 20a under this condition. When noise is input, the frequency element of it is sampled in every Δt and it is then stored in the memory 21 as the noise pattern data.

Such outputting of sampling data is repeated until the same sampling data is read to conduct registration of noise pattern.

Next, the noise eliminating operation while the telephone line is used will be explained.

(1) The mode setting means 3 selects the ordinary conversation/transmission mode. Under this condition, when conversation is started through the telephone set or transmission of image signal is started by the facsimile apparatus, the control signal is output to the filter control circuit 1a of the noise elimination circuit 1' from the signal processing circuit 20 and attenuation of all voltage control type band pass filters VCBPF1 ~n is set to zero.

(2) The signal processing circuit 20 always watches the frequency spectrum pattern which has been separated by the voltage control type band pass filters VCBPF1 ~n and converted to digital data by the A/D converting circuit 12, controls the filter control circuit 1a in accordance with the data stored in the memory 21 when the spectrum pattern matches with the frequency spectrum pattern of noise element stored in the memory 21 and causes the voltage control type band pass filter VCBPF to operate in order to eliminate only the noise element by controlling attenuation of frequency forming the noise element.

In this case, noise element may be eliminated so-called by operating the noise elimination circuit 1' through the feed forward control when the sampling is carried out in every Δt and the first sampling pattern of the frequency spectrum pattern stored in the memory 15 is matched.

As explained above, in the second embodiment, the S/N ratio can be improved by eliminating, on the real time basis, the noise element appearing not periodically during conversation or transmission and reception by previously sampling the spectrum pattern of noise element appearing on the telephone line 1 in the preceding stage of connecting the telephone line and then storing it within the memory. Accordingly, articulation of conversation or transmission of video signal can be enhanced and transmission rate can also be improved.

As will be understood from above explanation, the control circuit for automatic elimination of noise according to the present invention is capable of effectively eliminating noise element of the same pattern appearing during conversation or transmission/reception by registrating the noise pattern in the preceding stage of connecting the telephone line and thereby improves conversation quality, quality of image transmission of facsimile and transmission rate.

What is claimed is:

1. A control circuit for eliminating noise on a telephone line, comprising:
   mode setting means for setting the control circuit in one of a noise pattern registration mode and a transmission mode;
   reference tone selecting means, operable when the control circuit is in the noise pattern registration mode, for selecting a reference dial tone signal in accordance with a dial tone signal on the telephone line;
   noise pattern outputting means for storing and outputting a frequency spectrum pattern, the frequency spectrum pattern corresponding to a noise element on the telephone line when the control circuit is in the noise pattern registration mode; and
   noise eliminating means, operable when the control circuit is in the transmission mode, for eliminating a noise element from a transmission signal on the telephone line in accordance with the frequency spectrum pattern stored in the noise pattern outputting means.

2. A control circuit as claimed in claim 1, further comprising:
   a filter control circuit, wherein the noise eliminating means comprises a plurality of voltage control type band pass filters, the filters specifying a selection frequency by specifying a center frequency for each frequency step of $\Delta f$ within a frequency band of the noise element, the filters defining an attenuation level controlled by the filter control circuit.

3. A control circuit as claimed in claim 1, wherein the noise pattern outputting means detects the frequency spectrum pattern corresponding to the noise element on the telephone line by matching a phase and a level of a dial tone signal transmitted to the telephone line with a phase and a level of the reference redial tone signal and outputting a difference between the signals.

4. A control circuit as claimed in claim 3, wherein the noise pattern outputting means comprises an auto-gain control circuit for matching the levels of the reference dial tone signal and the dial tone signal transmitted to the telephone line, a zerocross synchronous circuit for matching the phases of the reference dial tone signal and the dial tone signal transmitted to the telephone line, a comparison circuit, operably connected to the auto-gain control circuit and the zerocross synchronous circuit, for outputting only the noise element of the dial tone signal transmitted to the telephone line, a band pass filter, operably connected to the comparison circuit, for separating the noise element of the dial tone signal transmitted to the telephone line into a plurality of frequency elements, an A/D converting circuit for converting the frequency elements into digital data, and a signal processing circuit for controlling the auto-gain control circuit, the zerocross synchronous circuit, the comparison circuit, and the band pass filter.

5. A control circuit as claimed in claim 1, wherein the noise pattern outputting means detects the frequency spectrum pattern corresponding to a noise element on the telephone line by eliminating a frequency spectrum element forming the reference dial tone signal from the dial tone signal transmitted to the telephone line.

6. A control circuit as claimed in claim 5, wherein the noise pattern means comprises an A/D converting circuit for converting the frequency element separated by the noise elimination circuit into digital data, a memory for storing digital data output from the A/D converting circuit; and a signal processing circuit for controlling the memory and the A/D converting circuit.

* * * * *